(12) United States Patent
Jakobsen et al.

(10) Patent No.: US 7,221,838 B2
(45) Date of Patent: May 22, 2007

(54) OPTICAL FIBERS WITH REDUCED SPLICE LOSS AND METHODS FOR MAKING SAME

(75) Inventors: Dan Jakobsen, Copenhagen East (DK); Bera Palsdottir, Copenhagen (DK); Torben E. Veng, Roskilde (DK)

(73) Assignee: Furukawa Electric North America, Inc., Norcross, GA (US)

( * ) Notice: Subject to any disclaimer, the term of this patent is extended or adjusted under 35 U.S.C. 154(b) by 234 days.

(21) Appl. No.: 10/874,648

(22) Filed: Jun. 23, 2004

(65) Prior Publication Data
US 2005/0286848 A1   Dec. 29, 2005

(51) Int. Cl.
*G02B 6/02* (2006.01)
*G02B 6/036* (2006.01)

(52) U.S. Cl. .................. 385/123; 385/126; 385/127

(58) Field of Classification Search .............. 385/123, 385/126, 127
See application file for complete search history.

(56) References Cited

U.S. PATENT DOCUMENTS

| | | | |
|---|---|---|---|
| 4,636,033 A | 1/1987 | Gagen | |
| 4,852,968 A | 8/1989 | Reed | |
| 4,971,418 A | 11/1990 | Dorsey | |
| 6,565,269 B2 | 5/2003 | Rils | |
| 6,603,914 B2 | 8/2003 | Edvold | |
| 2003/0026566 A1 | 2/2003 | Diep et al. | |
| 2003/0190128 A1* | 10/2003 | Jang et al. | 385/124 |
| 2004/0005126 A1 | 1/2004 | Yablon | |

FOREIGN PATENT DOCUMENTS

| | | |
|---|---|---|
| EP | 1 243 950 A2 | 9/2002 |
| EP | 1 243 950 A3 | 9/2002 |
| EP | 1 353 202 A2 | 10/2003 |
| EP | 1 353 202 A3 | 10/2003 |
| WO | WO 02/27367 A1 | 4/2002 |

OTHER PUBLICATIONS

Tam, "Simple Fusion Splicing Technique . . . ," Electronics Letters, IEEE Stevenage, GB, vol. 27, No. 17, Aug. 15, 1991, pp. 1597-1599, XP000253922, ISSN: 0013-5194.

* cited by examiner

*Primary Examiner*—Frank G. Font
*Assistant Examiner*—Jerry Martin Blevins
(74) *Attorney, Agent, or Firm*—Jacobs & Kim LLP; Daniel Kim, Esq.

(57) ABSTRACT

An optical fiber has a core region and a first cladding region surrounding the core. The first cladding region is doped to increase the fiber's refractive index volume. A second cladding region surrounds the first cladding region. The second cladding region is doped to reduce the fiber's cutoff wavelength, offsetting an increase in the fiber's cutoff wavelength caused by the first cladding region. An outer cladding surrounds the cutoff reduction region. In a further embodiment, the volume increasing region is doped to have a refractive index profile that is sloped to increase from the region's outer circumference towards its inner circumference. In another embodiment, the cutoff reduction region has a step refractive index profile that may have more than one section.

10 Claims, 9 Drawing Sheets

OPTICAL FIBERS WITH REDUCED SPLICE LOSS AND METHODS FOR MAKING SAME

BACKGROUND OF THE INVENTION

1. Field of the Invention

The present invention relates generally to improvements in the field of optical fiber, and more particularly to advantageous aspects of improved optical fibers with reduced splice loss and methods for making same.

2. Description of Prior Art

In the optical fiber industry, there is an ongoing effort to develop new types of fibers, such as erbium doped fibers (EDFs) and the like. However, it has proven to be difficult to maintain desired performance when these fibers are spliced to other fibers, particularly fibers having different modefield diameters (MFDs) and refractive index profiles (RIPs), such as a standard single mode fiber (SSMF).

It has been found that splicing an EDF to an SSMF results in a splice loss that is typically 0.1-0.2 dB higher than when other types of fiber are spliced to an SSMF. It is important to maintain low splice loss in order to obtain an acceptably low level of noise in such devices as an erbium doped fiber amplifier (EDFA). Maintaining low splice loss also typically results in an improvement in overall power conversion efficiency.

Achieving acceptable performance for EDFs is especially challenging in an optical amplifier, where low splice loss may be required for a wide signal wavelength range. An EDFA, for example, may be pumped at a wavelength of 980 nm to yield gain at 1550 nm. In this case, low splice loss may be required both around 980 nm and around 1550 nm.

In an EDFA in which an EDF is spliced to an SSMF, splice loss resulting from modefield mismatch may be reduced by thermally diffusing the refractive index profile (RIP) of the EDF during splicing, so that the RIP of the EDF approximates the RIP of the SSMF. In this case, the two fibers will have approximately the same evolution of the MFD with respect to wavelength at the splice point.

However, it has proved difficult to use a thermal diffusion technique to obtain an RIP for the EDF with the desired degree of similarity to the RIP of the SSMF, while maintaining an acceptably low cutoff wavelength. As mentioned above, an EDFA is commonly pumped at a wavelength of 980 nm. In order to ensure single mode propagation of the EDF in the amplifier in this situation, the cutoff wavelength of the EDF must be maintained at a level below 980 nm.

Further, splice loss issues are aggravated by variations in splice conditions, particularly in a volume production environment. These variations are caused by a number of factors that may be difficult to control, including worn splice electrodes and fluctuations in current control, as well as environmental conditions, such as humidity, temperature, pressure and the like. With current fiber designs, these variations can contribute significantly to splice loss.

SUMMARY OF THE INVENTION

To address such issues and others, an optical fiber in accordance with one aspect of the present invention has a core region and a volume increasing region surrounding the core. The volume increasing region is doped to increase the fiber's refractive index volume. A cutoff reduction region surrounds the volume increasing region. The cutoff reduction region is doped to reduce the fiber's cutoff wavelength, offsetting an increase in the fiber's cutoff wavelength caused by the first cladding region. An outer cladding surrounds the cutoff reduction region. According to a further aspect of the invention, the volume increasing region is doped to have a refractive index profile that is sloped to increase from the region's outer circumference towards its inner circumference. According to another aspect of the invention, the cutoff reduction region has a step refractive index profile that may comprise more than one section.

Additional features and advantages of the present invention will become apparent by reference to the following detailed description and accompanying drawings.

DETAILED DESCRIPTION

An optical fiber according to one aspect of the present invention displays reduced splice loss, while maintaining a desired cutoff wavelength. As described further below, such a fiber has a modefield that may be better confined, which in general decreases taper loss when the fiber's modefield diameter (MFD) is expanded during splicing. Although the present invention is described with respect to an erbium doped fiber EDF spliced to a standard single mode fiber (SSMF), the invention may also be used in conjunction with other fibers and splice combinations without departing from the spirit of the present invention. These other fibers and splice combinations include, for example: fibers doped with other dopants, such as thulium (Tm), ytterbium (Yb), neodymium (Nd), and the like; highly non-linear fibers; and intermediate fibers used when manufacturing dispersion compensation modules (DCMs).

The difficulty in splicing EDF and other types of fiber to SSMF can be understood by the following analysis, which holds for the cases of a step index profile. The cutoff of such a fiber depends on the core radius, r, and the refractive index change, $\Delta n$, relative to the cladding index:

$$\text{Cutoff} \propto r^*(\Delta n)^{1/2}$$

In an ideal case, at the splicing point $\Delta n$ and r for the EDF are identical to $\Delta n$ and r for the SSMF. If we assume that $\Delta n$ and dopants concentration are proportional, that the expanded profile is steplike, and that the SSMF is unaltered after splicing, the following relation between EDF and SSMF cutoff is obtained:

Cutoff (EDF)=Cutoff (SSMF)

since the EDF refractive index volume $\Delta n * r^2$ is preserved with the above assumptions. Thus, when splicing a prior art EDF to an SSMF, the thermal core diffusion required to match the modefield diameters of the two fibers causes the cutoff of the EDF, within the splice region, to approximate the cutoff of the SSMF. However, a typical SSMF cutoff is 1250 nm, which is far above the requirement for the EDF in certain applications.

Figure 1:
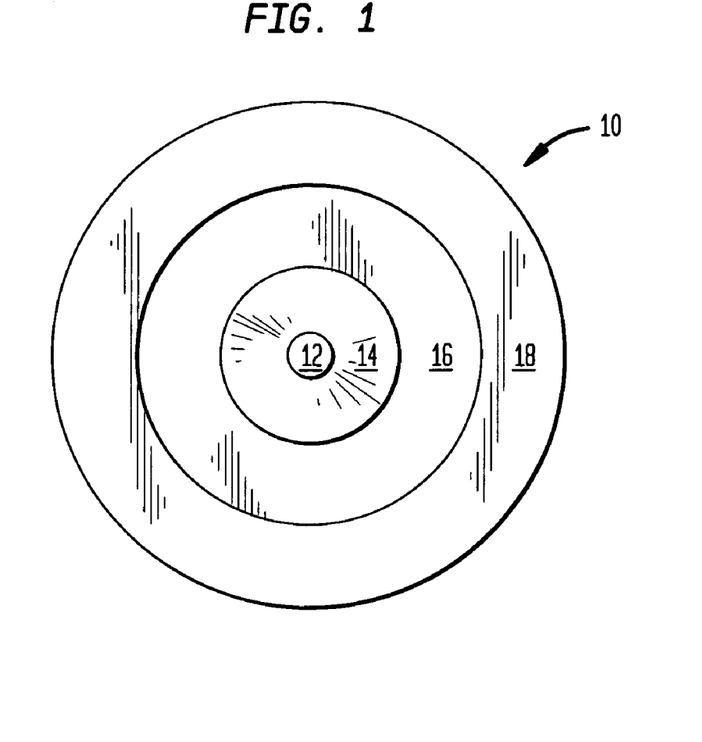
FIG. 1 shows a cross section of an optical fiber according to a first aspect of the invention.
Figure 2:
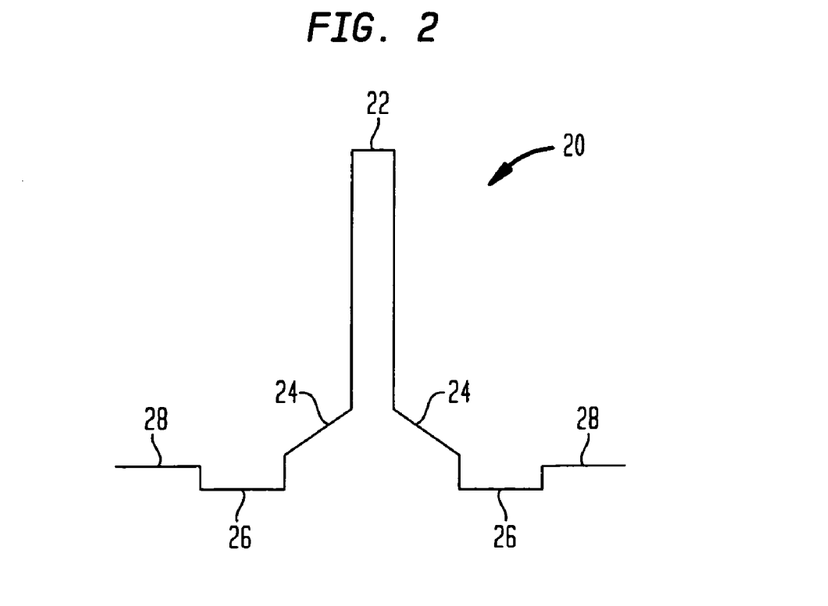
FIG. 2 shows a theoretical refractive index profile for the fiber shown in FIG. 1.

FIG. 1 shows a cross section of an optical fiber 10 according to a first aspect of the invention, not drawn to scale. FIG. 2 shows a model refractive index profile (RIP) 20 for the fiber 10. As shown in FIG. 1, the fiber 10 comprises a plurality of regions: a central core region 12 and first, second, and third cladding regions 14, 16, and 18 surrounding the core region 12 in concentric layers. The RIP 20 shown in FIG. 2 illustrates the diametric change in refractive index n of the fiber 10.

In the RIP 20, the central spike 22 corresponds to the fiber's core region 12. The two sloped regions 24 at the right and left of the central spike 22 correspond to the first cladding layer 14. The two trenches 26 at the right and left of the sloped regions 24 and correspond to the second cladding layer 16. The two flat regions 28 at the right and left of the trenches 26 correspond to the third cladding layer 18.

In RIP 20, the change in refractive index n is referenced to the refractive index of the outer cladding layer 18. Thus, the third cladding layer 18, which corresponds to the two flat regions 28 at the right and left of the RIP 20, has a n of 0.0. As shown in the RIP 20, the first cladding layer 14 of the fiber 10 shown in FIG. 1 has a positive n that increases the volume of the fiber modefield, and is referred to hereinafter as a "volume increasing region." As shown in the RIP 20, the refractive index of the volume increasing region 14 is sloped. According to one aspect of the present invention, n for the volume increasing region 14 increases linearly from the region's outer circumference to a higher value at the region's inner circumference. The shape of the refractive index for the volume increasing region 14 may be modified. For example, the shape can be optimized for low taper loss when the MFD is expanded gradually along the fiber axis.

The second cladding layer 16 has negative n that reduces the cutoff wavelength of the fiber, and is referred to hereinafter as a "cutoff reduction region." As discussed above, an increase in refractive index volume tends to increase a fiber's cutoff wavelength. The cutoff reduction region 16 offsets the increase in fiber cutoff caused by the volume increasing region 14. Thus, according to this further aspect of the present invention, the volume increasing region 14 and the cutoff reduction region 16 combine to increase the fiber refractive index volume while maintaining a desired cutoff wavelength. In addition, as discussed below, the fiber design 10 shown in FIG. 1 also displays improved splice quality under a wide range of splicing conditions.

Figure 3:
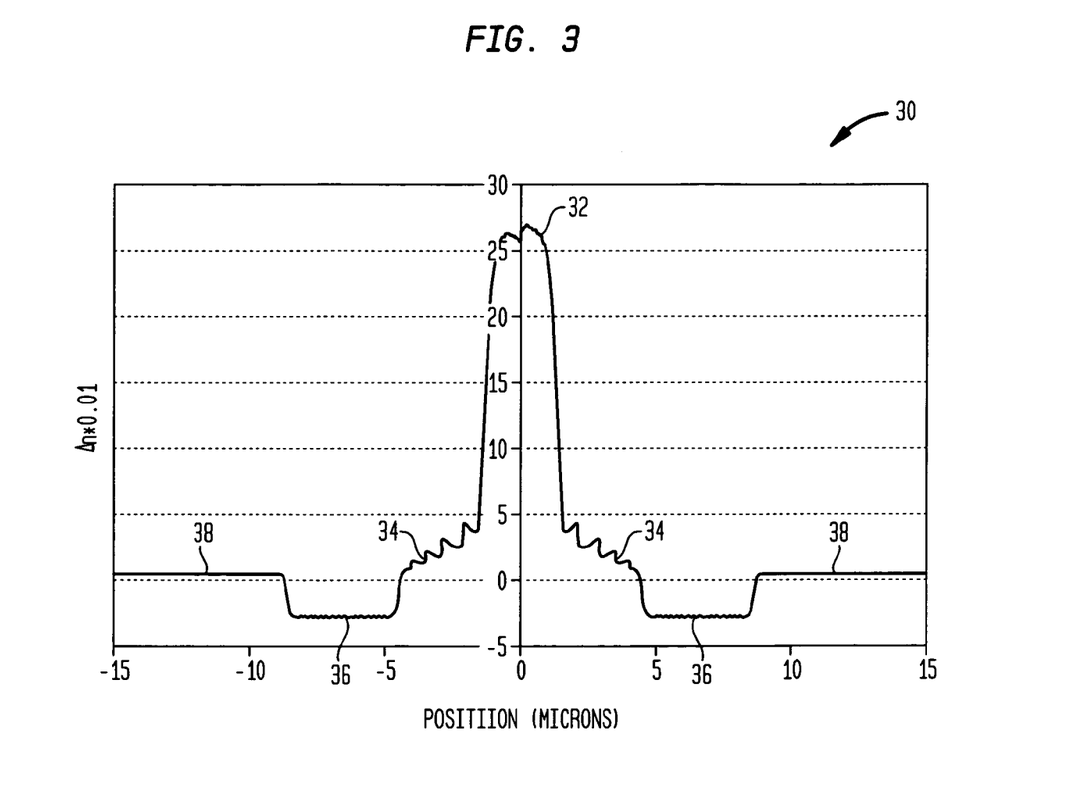
FIG. 3 shows a refractive index profile for a prototype of the fiber shown in FIG. 1.

FIG. 3 shows an RIP 30 of a prototype fiber embodying the design of the fiber 10 shown in FIG. 1. The RIP 30 includes a central peak 32 corresponding to the fiber core 12, a pair of sloped shoulders 34 corresponding to the volume increasing region 14, a pair of trenches 36 corresponding to the cutoff reduction region 16, and a pair of flat regions 38 corresponding to the outer cladding 18 of the fiber 10.

The prototype fiber was manufactured using a modified chemical vapor deposition (MCVD) technique. However, other manufacturing techniques may be used without departing from the spirit of the invention. These other techniques include vapor axial deposition (VAD), outside vapor deposition (OVD), or solution doping. An exemplary MCVD technique, suitable for use in fabricating a fiber according to the present invention, is described in Tankala, U.S. Pat. No. 6,578,387, which is assigned to the assignee of the present invention, and which is incorporated herein by reference. In an MCVD, a hollow outer tube, fabricated from a desired outer cladding material, is rotatably mounted into a lathe or other suitable device. As the hollow tube is rotated, a series of chemical vapors are caused to flow through the tube while a burner is moved back and forth down the length of the underside of the tube. These chemicals include, for example, $O_2$, $SiCl_4$, $GeCl_4$, and the like. The heat applied by the torch initiates the deposition of vapors onto the interior of the tube in a series of layers. The refractive index of each layer is determined by the mutual ratio of deposited $SiO_2$ and dopant. Once the deposition process has been completed, the tube is heated at increased temperature and decreased air pressure to cause the tube and deposited chemicals to collapse into a solid preform. The preform is loaded into a draw tower where it is heated and drawn into optical fiber.

In the present prototype, the cutoff reduction region 16 was fabricated by using fluorine (F) as a dopant to lower the region's refractive index. In the MCVD process described above, fluorine was introduced in the form of silsesquioxane fluoride ($SiO_{1.5}F$), at a molar concentration of 0-3%. The volume increasing region 14 was fabricated by using germanium (Ge) as a dopant to raise the region's refractive index. In the MCVD process, germanium was introduced in the form of germanium oxide $GeO_2$ at a molar concentration of 0-15%. The molar concentration of the germanium oxide in the volume increasing region was increased with each deposited layer to form the sloped shoulders 34 shown in FIG. 3.

In the prototype fiber, the core was fabricated using a solution doping technique. According to this technique, the partially formed preform with deposited soot layers was removed from the MCVD lathe and then immersed in a solution containing the core dopants aluminum (Al), lanthanum (La), and erbium (Er) to form the central spike 32 of the RIP 30. The preform was then remounted into the MCVD lathe and dried by causing chlorine gas to flow through the preform tube. Finally, the preform was heated at an elevated temperature and decreased air pressure to cause the soot layers to sinter, and to cause the preform to collapse into a solid cylinder.

It will be recognized that the prototype is exemplary and that the present invention is not limited to the manufacturing techniques and specific dopants described above. Other dopants may be used without departing from the spirit of the invention. These other dopants include, for example, $P_2O_5$, $B_2O_3$, and the like.

In this embodiment of the invention, it will be appreciated that the volume increasing region 34 is doped with germanium. Thus, there is no fluorine next to the fiber core 32. Previous studies have shown that fluorine raises taper losses during splicing. Thus, moving fluorine away from the core 32, where most of the fiber modefield is located, tends to reduce this effect.

According to a further aspect, the present invention may be used to modify a prior fiber design without substantially changing the fiber's core. The modified fiber displays improved splice performance, while substantially retaining the optical properties of the prior design. According to this aspect of the invention, the prior design is modified by surrounding the core with a volume increasing region, such as the volume increasing region 14 shown in FIG. 1. As discussed above, the addition of a volume increasing region increases the fiber's refractive index volume. The fiber design is further modified by surrounding the volume increasing region with a cutoff reduction region, such as the cutoff reduction region 16 shown in FIG. 1. As discussed above, the cutoff reduction region offsets any increase in the fiber's cutoff wavelength caused by the volume increasing region. Because the same core is used, the modified fiber retains certain desirable properties including, for example, gain curves, modefield diameter, and the like, while displaying improved splice performance.

Figure 4:
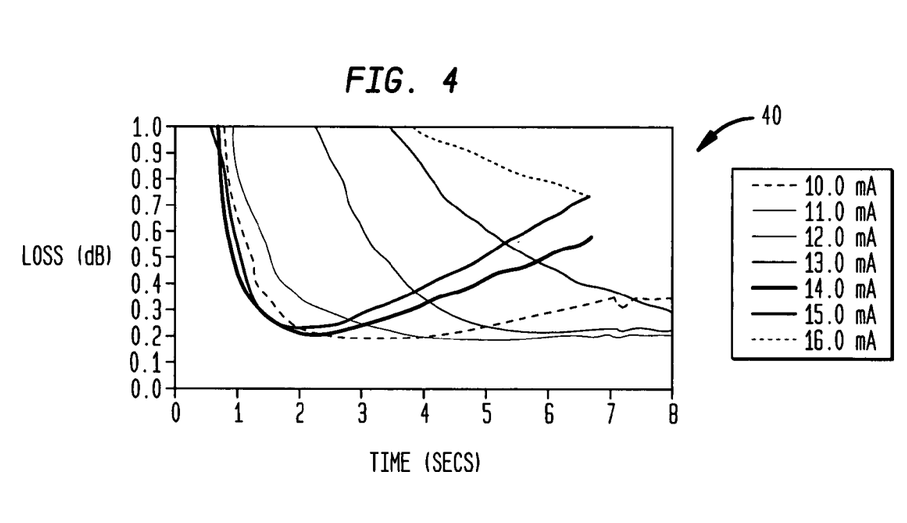
FIGS. 4 and 5 show a pair of graphs comparing the splice performance of the prototype fiber with a control fiber.
Figure 5:
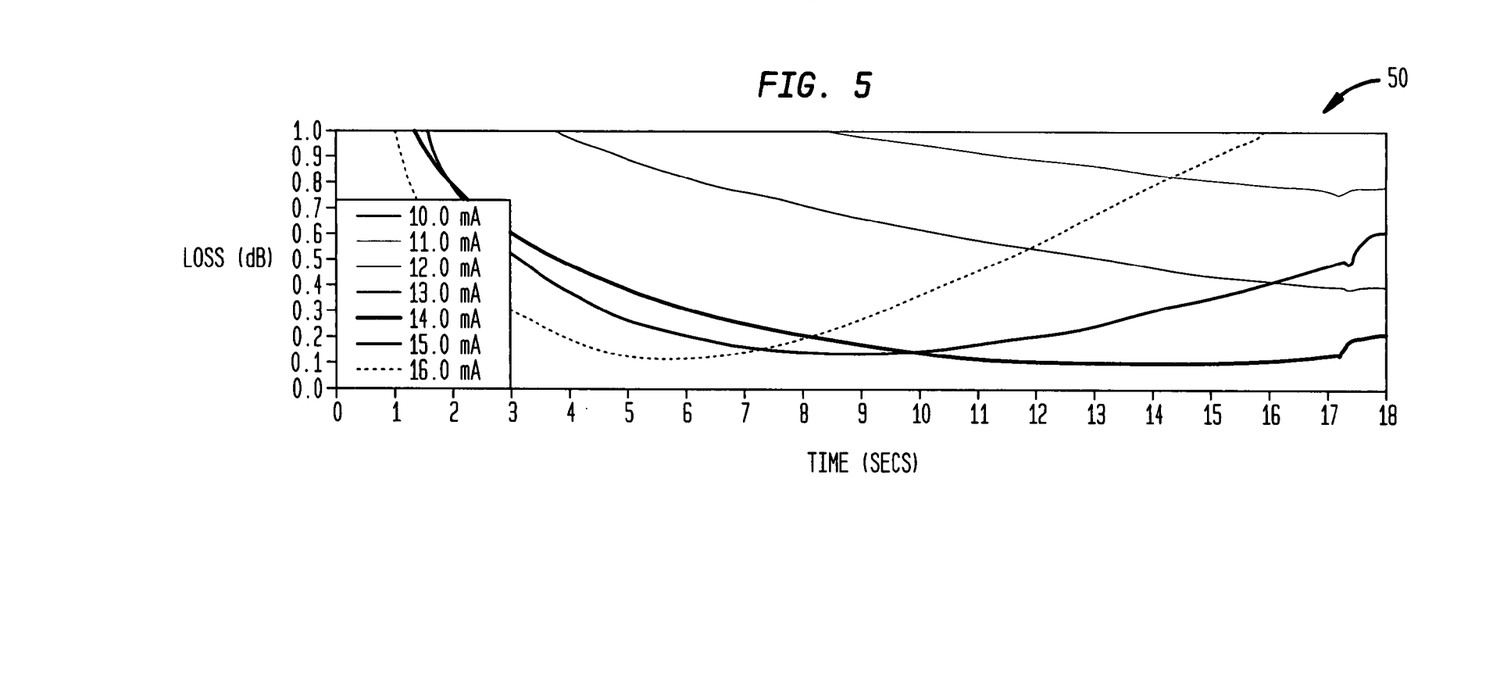

The prototype fiber was tested by comparing its performance with that of a control fiber having the same core, but with a traditional matched cladding that did not include volume increasing or cutoff reduction regions. Each fiber's splicing performance was tested by conducting a series of trial splices, in which an Ericsson FSU995 fusion splicer was used to splice the fiber to an SSMF at arc currents ranging from 10.0 mA to 16.0 mA to vary the rates of dopant diffusion. Splice losses were measured at 1550 nm, and the results were graphed as a function of time. FIG. 4 shows a graph 100 illustrating the splicing performance of the control fiber, and FIG. 5 shows a graph 200 illustrating the splicing performance of the prototype fiber. Both fibers had a cutoff wavelength below 980 nm.

In FIG. 4, it will be seen that the minimum amount of splice loss obtainable with the control fiber is approximately 0.2 dB. In FIG. 5, it will be seen that the minimum amount of splice loss obtainable with the prototype fiber is approximately 0.1 dB. Further, it will be seen in FIG. 5 that the rate of thermally induced modefield expansion in the prototype fiber is significantly lower than the rate of modefield expansion of the control fiber. This lower rate of modefield expansion is reflected in the splice loss function shown in FIG. 5, which ranges over 17 seconds, compared with the splice loss function shown in FIG. 4, which ranges over 7 seconds. This lower rate of expansion is important in other splice combinations, in which modefield expansion is undesirable, such as when an EDF is spliced to itself or to another fiber having a similar RIP.

The graphs shown in FIGS. 4 and 5 illustrate a further aspect of the present invention. As shown in these graphs, in addition to yielding a reduced splice loss, a fiber according to the present invention has a very stable splice performance, allowing suitable splices to be made under a wide range of variations in splicing conditions. Comparing the two graphs, it will be seen that the FIG. 5 graph displays a greater tolerance with respect to deviations from an optimal splicing time and current. This aspect of the invention is significant because the production of EDFAs and other optical fiber devices is being moved from smaller factories and laboratories to companies specialized in volume production.

In a volume production environment, it is desirable for optical fiber products to be consistent, reliable and easy to handle. In volume production, worn splice electrodes, fluctuations in current control, and variations in environmental conditions such as humidity, temperature, pressure and the like, make it difficult always to maintain identical splice conditions.

Figure 6:
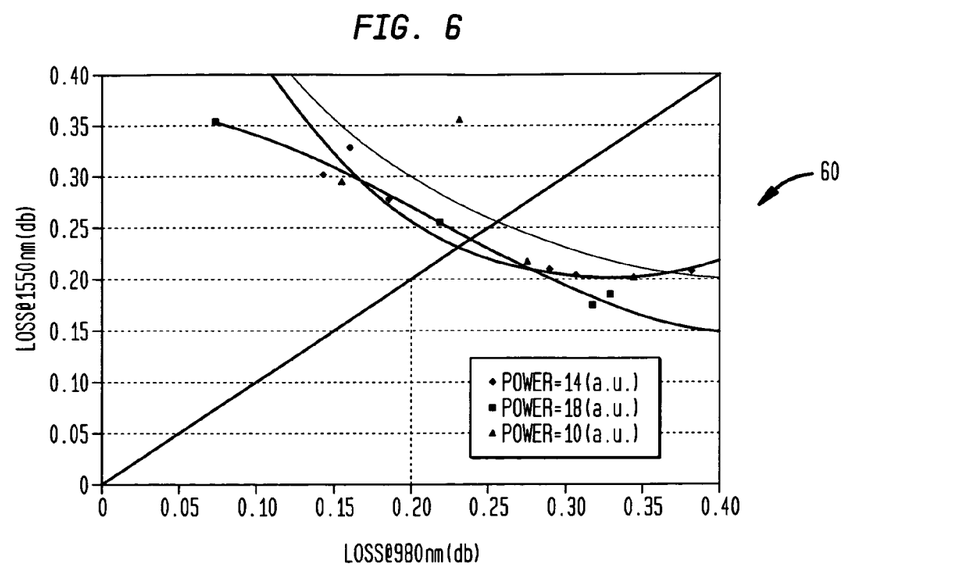
FIGS. 6 and 7 show a pair of graphs comparing the splice performance of the prototype fiber with a control fiber at 1550 nm and 980 nm.
Figure 7:
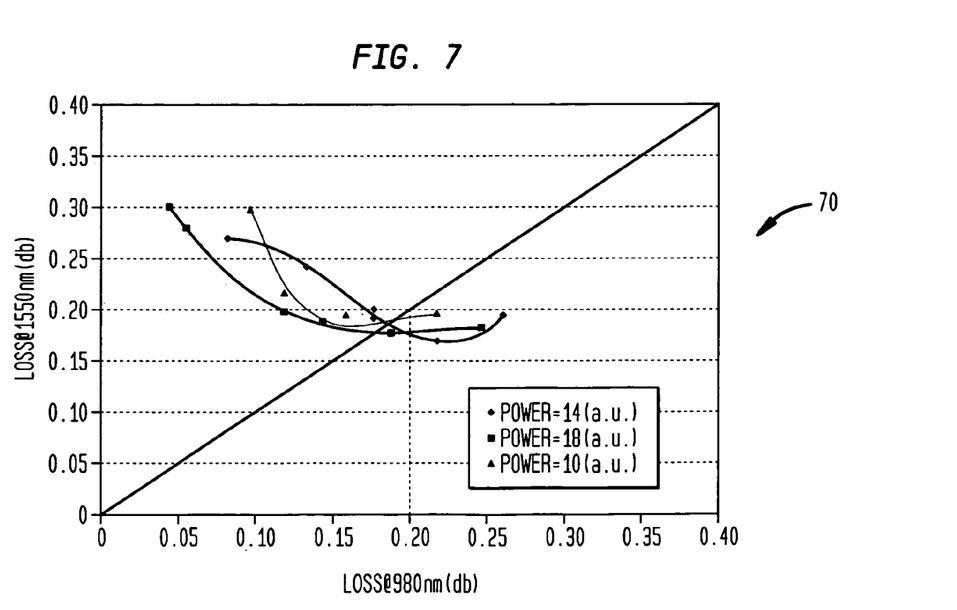

As mentioned above, wavelength dependence is also an important parameter in evaluating the splicing performance of an optical fiber. Accordingly, additional tests were conducted, in which splice loss was measured at both 980 and 1550 nm for splices to SSMF. FIG. 6 shows a graph 60 illustrating the results of these tests for the control fiber, and FIG. 7 shows a graph 70 illustrating the results of these tests for the prototype fiber. For these tests, a Sumitomo Type-36 fusion splicer was used. Fusion times and arc power levels were varied and corresponding loss values at 980 and 1550 nm were measured after the splices were made. It is seen in the FIG. 7 graph 70 that it is possible to obtain wavelength independent losses having values below 0.20 dB for the prototype fiber. However, as shown in the FIG. 6 graph 60, wavelength independent losses were over 0.20 dB for the control fiber.

Figure 8:
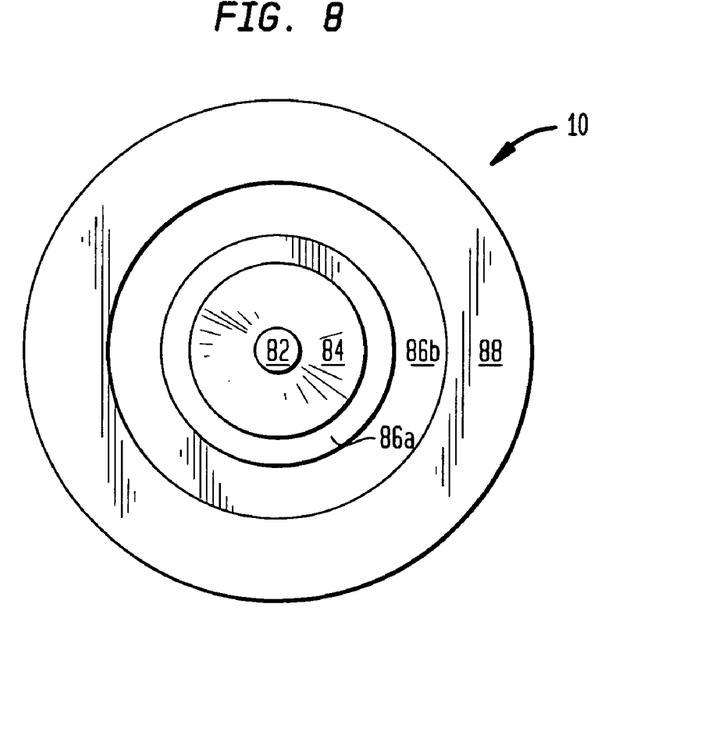
FIG. 8 shows a cross section of an optical fiber according to a further aspect of the invention.
Figure 9:
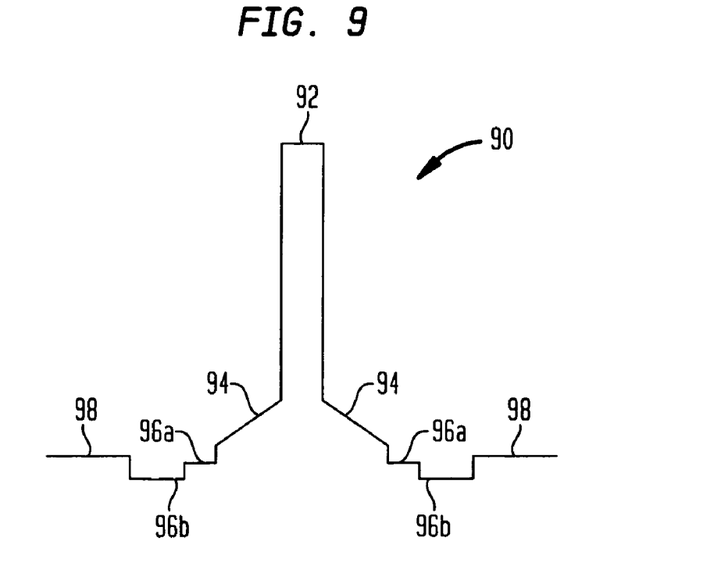
FIG. 9 shows a refractive index profile for the fiber shown in FIG. 8.
Figure 10:
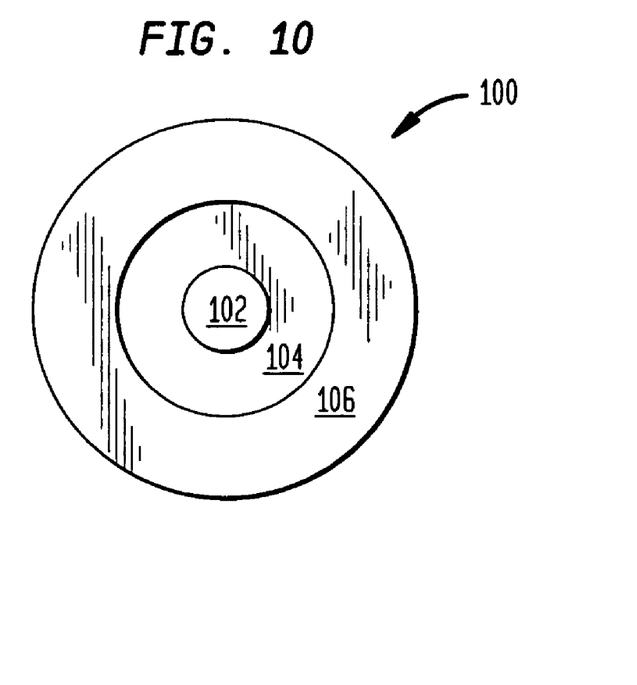
FIG. 10 shows a cross section of an optical fiber according to a further aspect of the invention.
Figure 11:
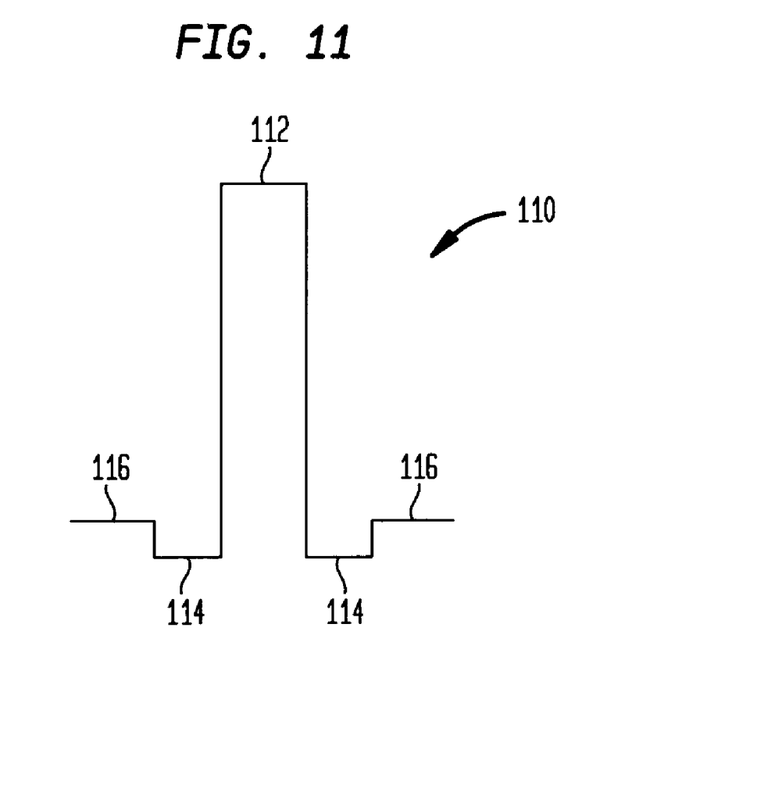
FIG. 11 shows a refractive index profile for the fiber shown in FIG. 10

Desired refractive index volumes and cutoff wavelengths can be achieved by variations of the above described aspects of the invention. FIG. 8 shows an optical fiber 80 according to a further aspect of the invention, and FIG. 9 shows a refractive index profile 90 for the fiber 100. As shown in FIGS. 10 and 11, the fiber includes a central core 82 and a volume increasing region 84 surrounding the core. According to this aspect of the invention, the volume increasing region 84 is surrounded by a cutoff reduction region including an inner section 86a and an outer section 86b. Surrounding the outer section 86b of the cutoff reduction region is an outer cladding layer 88. In FIG. 9, the central spike 92 corresponds to the fiber core 82, the sloped shoulders 94 correspond to the volume increasing region 84, the inner trench regions 96a correspond to the inner section 86a of the cutoff reduction region, the outer trench regions 96b correspond to the outer section 86b of the cutoff reduction region, and the outer flat regions 98 correspond to the outer cladding layer 88.

The inner section 86a has a lower concentration of dopant level, which tends to minimize diffusion of dopant from the cutoff reduction region into the core and volume increasing region during thermal treatment of a splice. This diffusion tends to reduce refractive index volume at the splice point. It would also be possible for the inner section 86a to be undoped. This lower concentration of dopant in the inner section 86a is useful, for example, where the cutoff reduction region is doped with fluorine. Fluorine dopant typically diffuses more rapidly than other dopants in an optical fiber. Thus, where fluorine is used to dope the cutoff reduction region, it may be advantageous to provide some separation between the more heavily doped outer section 86b of the cutoff reduction region and the volume increasing region 84.

According to a further aspect of the invention, a desired combination of refractive index volume and cutoff wavelength may also be obtained by combining an increased core diameter with a suitable cutoff reduction region. FIG. 10 shows a cross section of an optical fiber 100 according to this aspect of the invention, and FIG. 11 shows an RIP 110 corresponding to the fiber 100 shown in FIG. 10. As shown in FIG. 10, the fiber 100 includes a core region 102 with a diameter that has been enlarged to increase the fiber's refractive index volume. Surrounding the core region 102 is a cutoff reduction region 104 that is designed to offset any increase in cutoff wavelength caused by the increase in the fiber's refractive index volume. Surrounding the cutoff reduction region 104 is an outer cladding layer. FIG. 11 shows an RIP 110 for the fiber 100. The central spike 112 corresponds to the fiber core 102. The trenches 114 correspond to the cutoff reduction region 104, and the outer flat regions 116 correspond to the outer cladding region 106.

According to a further aspect of the invention, a volume increasing region may be used without a corresponding cutoff reduction region. This aspect of the invention may be used, for example, in situations in which an increased cutoff wavelength is acceptable. Such a fiber would still, however, exhibit improved splicing performance. Returning to FIGS. 1 and 2, such a fiber could be fabricated by removing region 16 and having outer cladding layer 18 extend all the way to the outer circumference of the volume increasing region 14. Removing region 16 would, of course, remove the trenches 26 in the FIG. 2 RIP.

Figure 12:
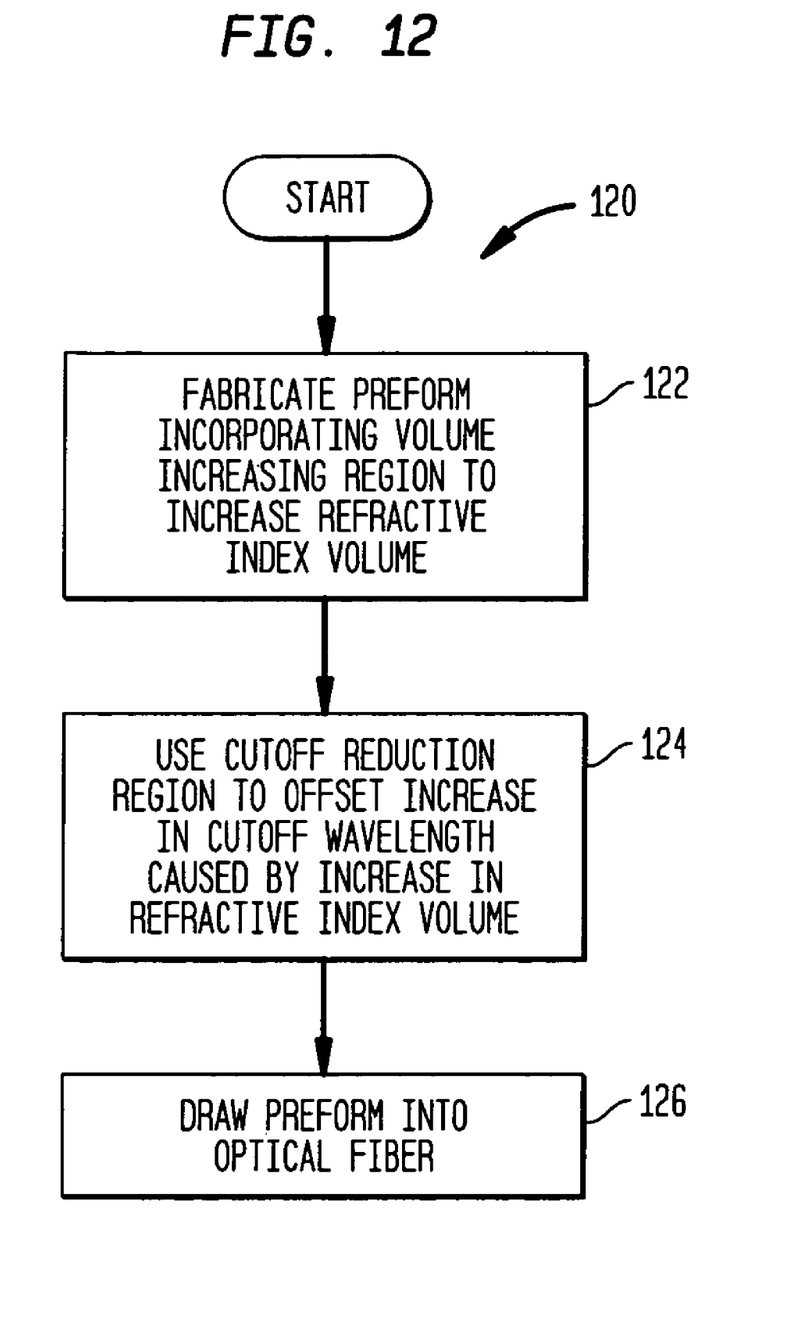
FIGS. 12-14 show methods according to further aspects of the invention for fabricating an optical fiber having improved splice performance.

FIG. 12 shows a flowchart of a method 120 according to a further aspect of the invention for fabricating an optical fiber with improved splicing performance. In step 122, a preform is fabricated incorporating a volume increasing region, such as the volume increasing region 14 shown in FIG. 1 or the volume increasing region 84 shown in FIG. 8, discussed above. The shape of the refractive index profile of the volume increase region 84 may be modified without departing from the spirit of the invention. In step 124, a cutoff reduction region is used to offset an increase in cutoff wavelength caused by the increase in refractive index volume caused by the volume increasing region. This cutoff reduction region may comprise a single section, such as the cutoff region 16 shown in FIG. 1, or may include more than one section, such as the two section cutoff reduction region 86a and 86b shown in FIG. 8. In step 126, the preform is drawn into optical fiber.

Figure 13:
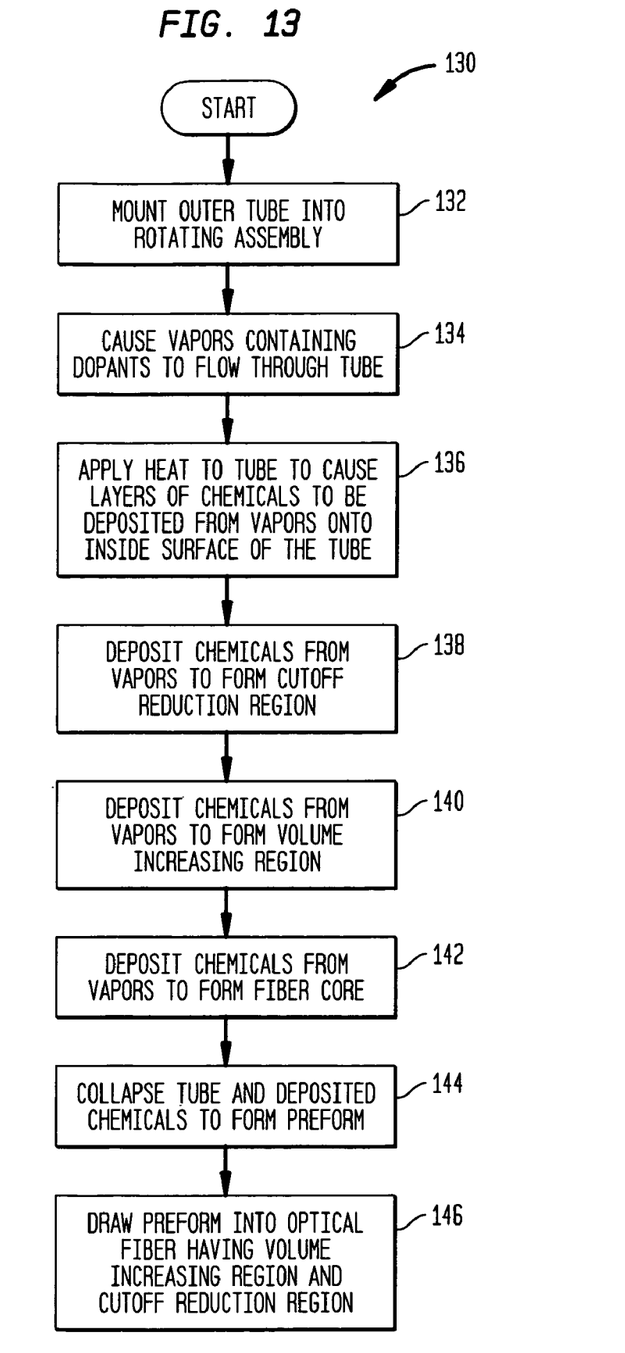

FIG. 13 shows a flowchart of a method 130 according to a further aspect of the invention, in which an MCVD technique is used to fabricate an optical fiber having improved splice performance. In step 132, an outer tube is mounted into a rotating assembly, such as a lathe. In step 134, vapors containing chemical dopants are caused to flow through the tube. In step 136, heat is applied to the tube to cause layers of chemicals to be deposited from the vapors onto the inner surface of the tube. In step 138, chemicals are deposited to form a cutoff reduction region. As discussed above, this cutoff reduction region may comprise a single section or a plurality of sections. In step 140, chemicals are deposited to form a volume increasing region. If a sloped volume increasing region is desired, the dopant concentration is gradually increased as the region is created.

In step 142, chemical are deposited to form a central core region. As discussed above, this step may be accomplished using a solution doping technique. It would also be possible, without departing from the spirit of the invention, to use other suitable techniques to form the core region, including a vapor deposition technique. In step 144, the tube is collapsed by applying increased heat and decreased pressure to form a solid preform. In step 146, the preform is drawn into optical fiber.

Figure 14:
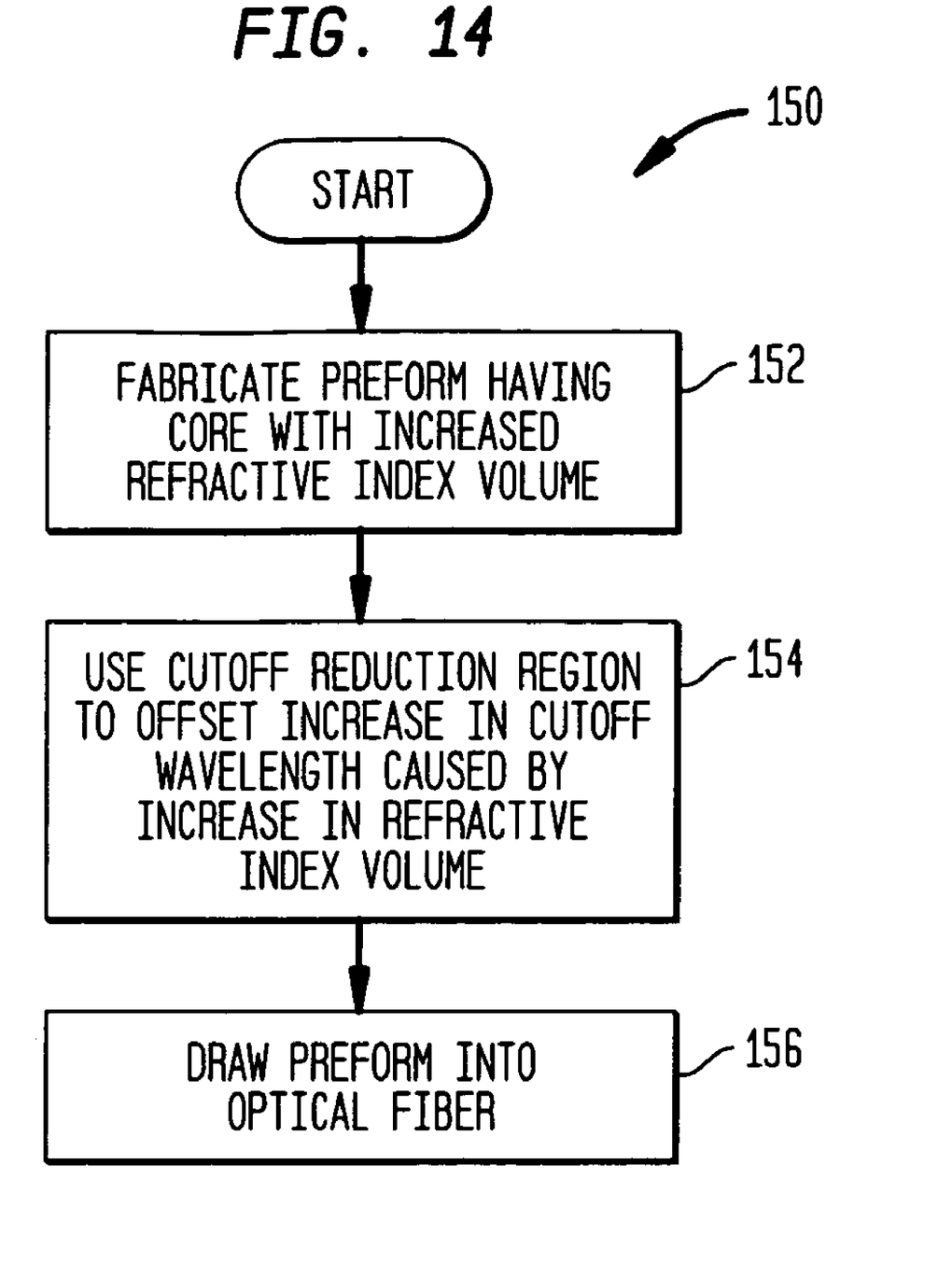

FIG. 14 shows a flowchart of a method 150 according to a further aspect of the invention. In step 152, a preform is fabricated having a core with an increased refractive index volume. In step 154, a cutoff reduction region is used to offset an increase in cutoff wavelength caused by the increase in refractive index volume. In step 156, the preform is drawn into optical fiber.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An optical fiber, comprising:
    a core region doped to have a positive refractive index relative to the refractive index of an outer cladding region;
    a volume increasing region surrounding the core, the volume increasing region being doped to have a refractive index that slopes upwardly from a value at its outer circumference equal to that of the outer cladding region to a value at its inner circumference that is substantially lower than that of the core region, such that the volume increasing region increases the fiber's refractive index volume; and
    a cutoff reduction region surrounding the volume increasing region, the cutoff reduction region being doped to have a negative refractive index, relative to the refractive index of the outer cladding region, such that the cutoff reduction region offsets an increase in the fiber's cutoff wavelength caused by the volume increasing region.

2. The fiber of claim 1, wherein the cutoff reduction region has a step refractive index profile.

3. The fiber of claim 2, wherein the cutoff reduction region has an inner section and an outer section having different refractive indices.

4. The fiber of claim 3, wherein the outer section of the cutoff reduction region is doped more heavily than the inner section.

5. The fiber of claim 1, wherein the volume increasing cladding region is doped with germanium, and wherein the cutoff reduction region is doped with fluorine.

6. A method for fabricating an optical fiber, comprising:
    fabricating a core region by doping a region of the fiber to have a positive refractive index, relative to the refractive index of an outer cladding region;
    surrounding the core region with a volume increasing region doped to have a refractive index profile that slopes upwardly from a value at its outer circumference equal to that of the outer cladding region to a value at its inner circumference that is substantially lower than that of the core region, such that the core refractive index volume is increased; and
    surrounding the volume increasing region with a cutoff reduction region that is doped to have a negative refractive index, relative to the refractive index of the outer cladding region, such that the cutoff region offsets an increase in the fiber cutoff wavelength caused by the volume increasing region.

7. The method of claim 6, wherein the step of surrounding the volume increasing region with a cutoff reduction region includes doping the cutoff reduction region to have a step refractive index profile.

8. The method of claim 7, wherein the step of surrounding the volume increasing region with a cutoff reduction region includes doping the cutoff reduction region to have an inner section and an outer section having different refractive indices.

9. The method of claim 8, wherein the outer section is doped more heavily than the inner section.

10. The method of claim 6, wherein the volume increasing region is doped with germanium, and wherein the cutoff reduction region is doped with fluorine.

* * * * *